Figure 1:
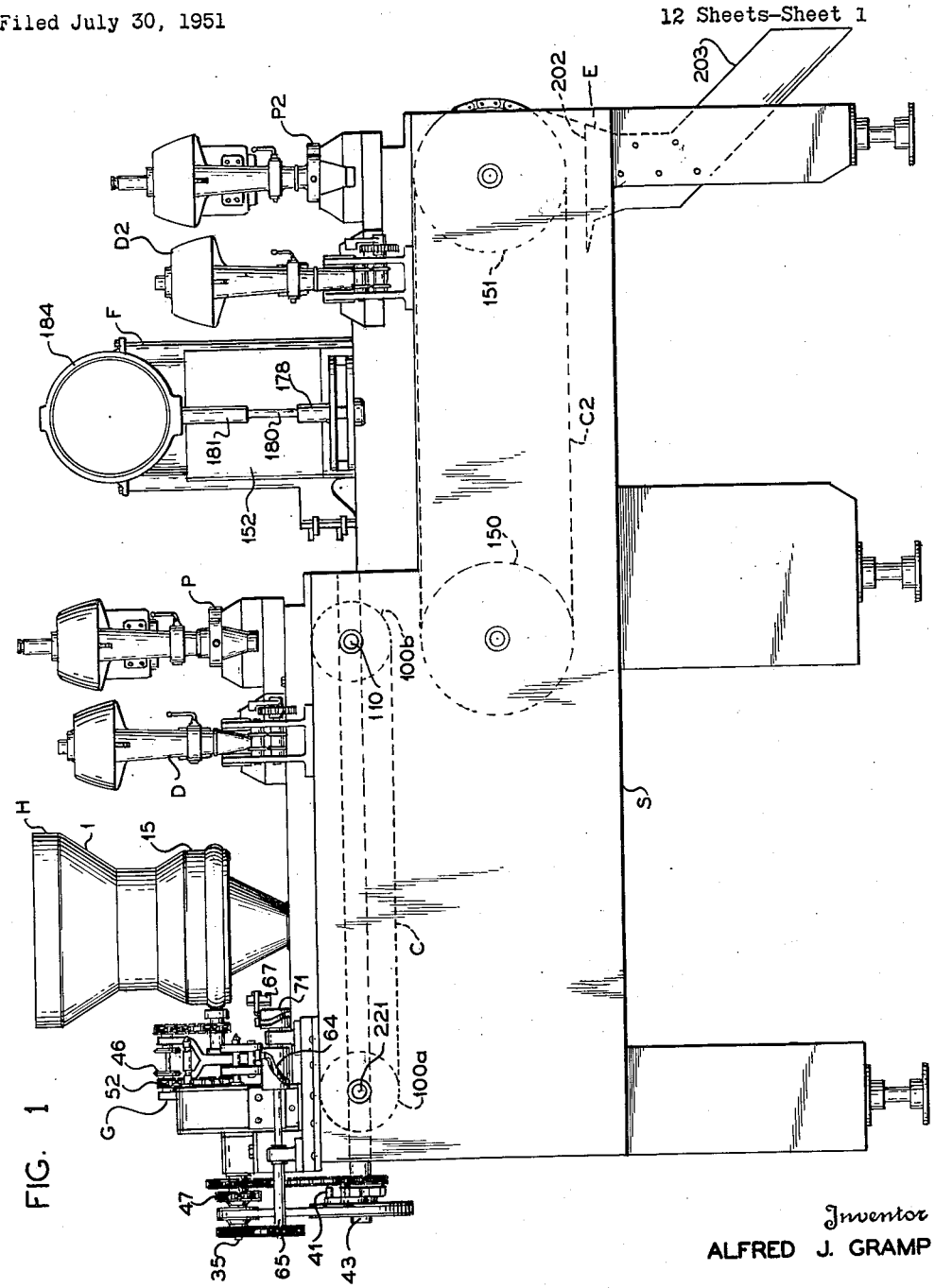

July 25, 1961 A. J. GRAMP 2,993,317
MACHINE FOR PRODUCING AND FILLING TUBULAR CONTAINERS
Filed July 30, 1951 12 Sheets-Sheet 1

Inventor
ALFRED J. GRAMP

By Sd Shappirio

ATTORNEY

July 25, 1961 A. J. GRAMP 2,993,317
MACHINE FOR PRODUCING AND FILLING TUBULAR CONTAINERS
Filed July 30, 1951 12 Sheets-Sheet 2

Inventor
ALFRED J. GRAMP

By Sol Shapiro
ATTORNEY

July 25, 1961 A. J. GRAMP 2,993,317
MACHINE FOR PRODUCING AND FILLING TUBULAR CONTAINERS
Filed July 30, 1951 12 Sheets-Sheet 3

Inventor
ALFRED J. GRAMP

By Sol Shapiro

ATTORNEY

July 25, 1961  A. J. GRAMP  2,993,317
MACHINE FOR PRODUCING AND FILLING TUBULAR CONTAINERS
Filed July 30, 1951  12 Sheets-Sheet 4

INVENTOR.
ALFRED J. GRAMP
BY Sol Shappirio
ATTORNEY

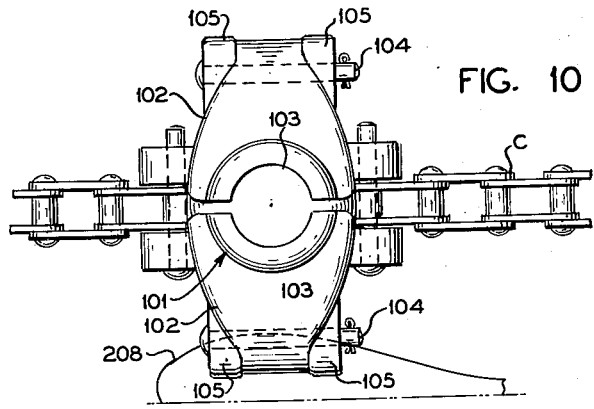
FIG. 10
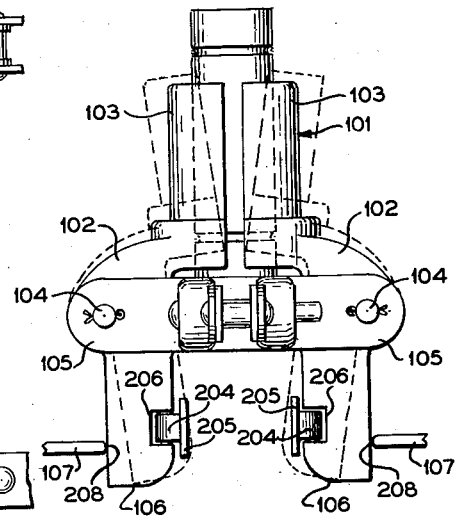
FIG. 12
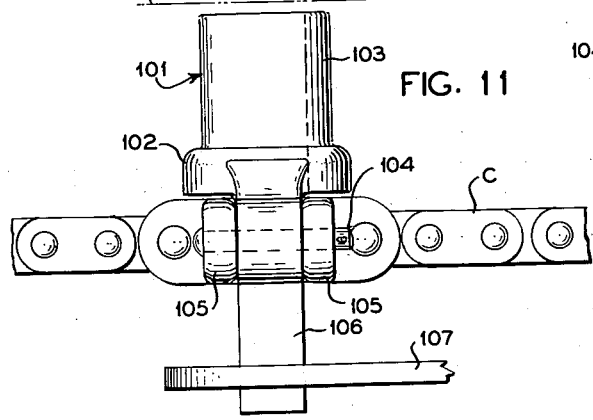
FIG. 11
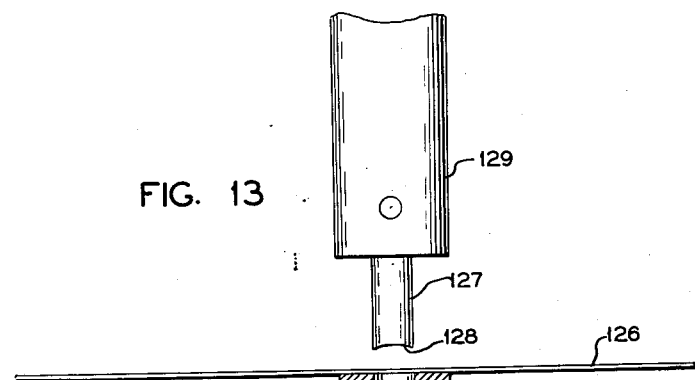
FIG. 13
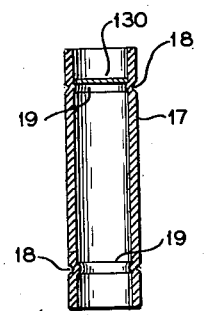
FIG. 14
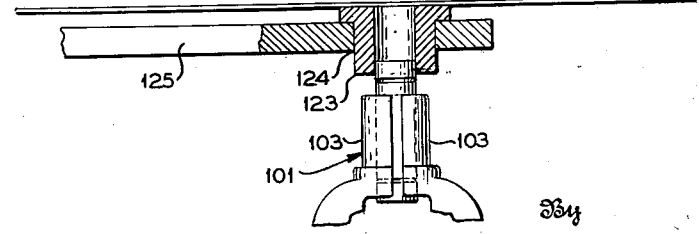
Inventor
ALFRED J. GRAMP
Sol Shapiro
ATTORNEY

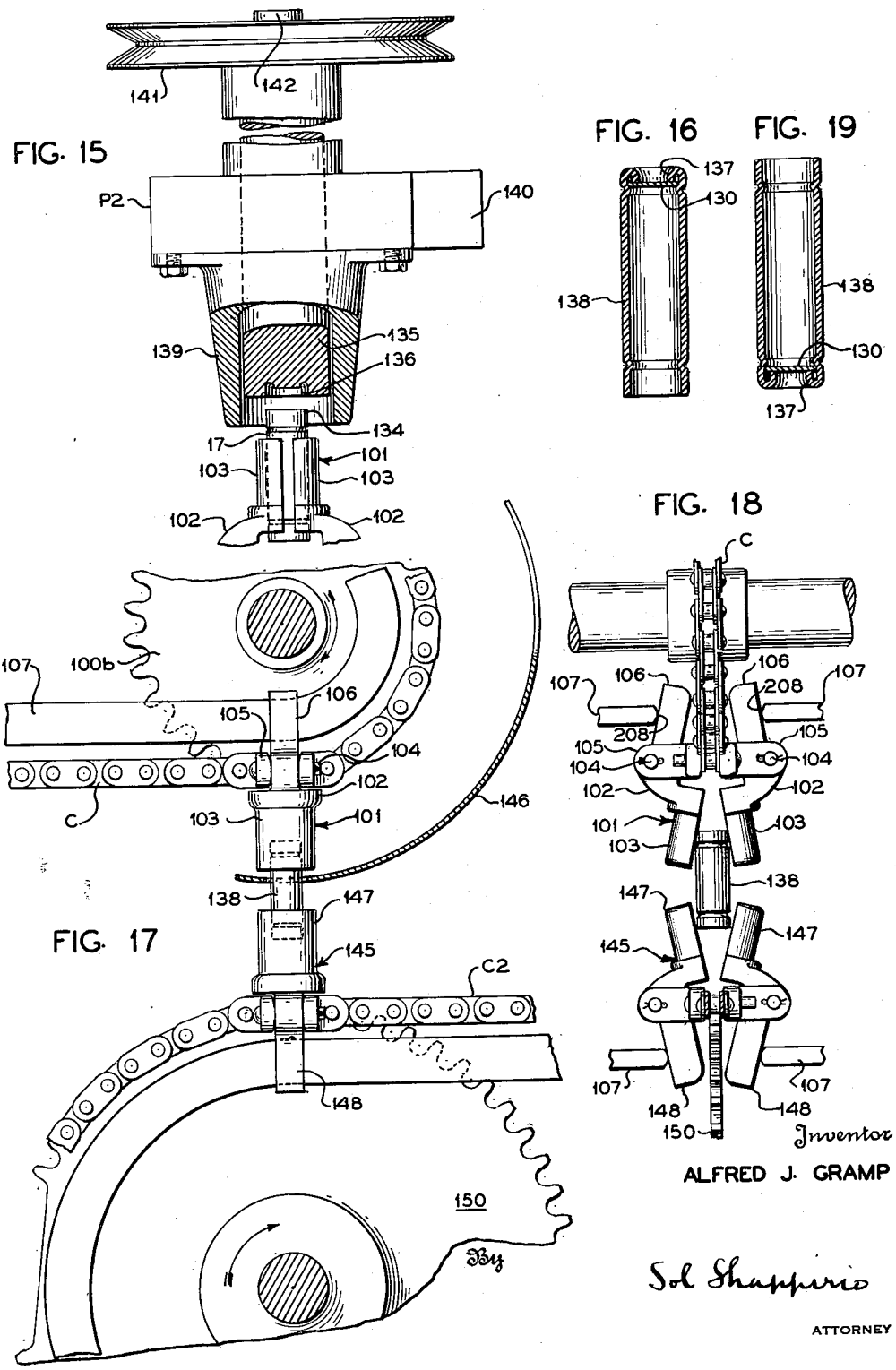

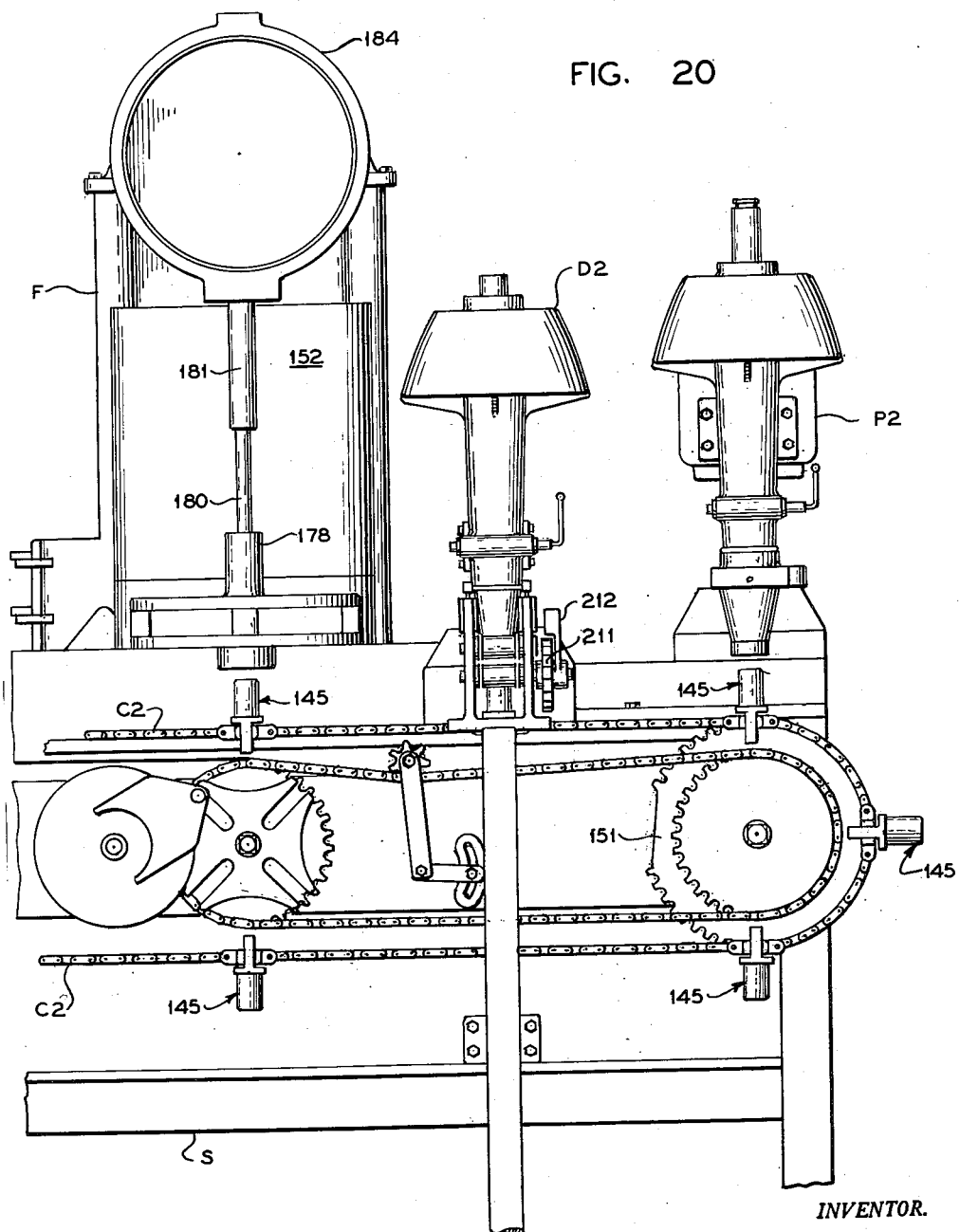

July 25, 1961  A. J. GRAMP  2,993,317
MACHINE FOR PRODUCING AND FILLING TUBULAR CONTAINERS
Filed July 30, 1951  12 Sheets-Sheet 8

INVENTOR.
ALFRED J. GRAMP
BY
Sol Shappirio
ATTORNEY

July 25, 1961  A. J. GRAMP  2,993,317
MACHINE FOR PRODUCING AND FILLING TUBULAR CONTAINERS
Filed July 30, 1951  12 Sheets-Sheet 9
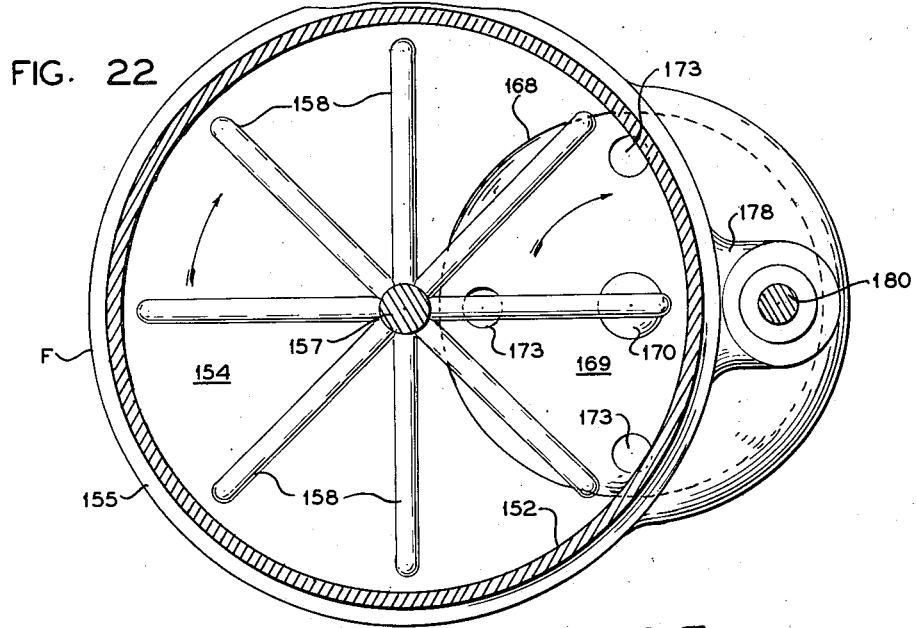
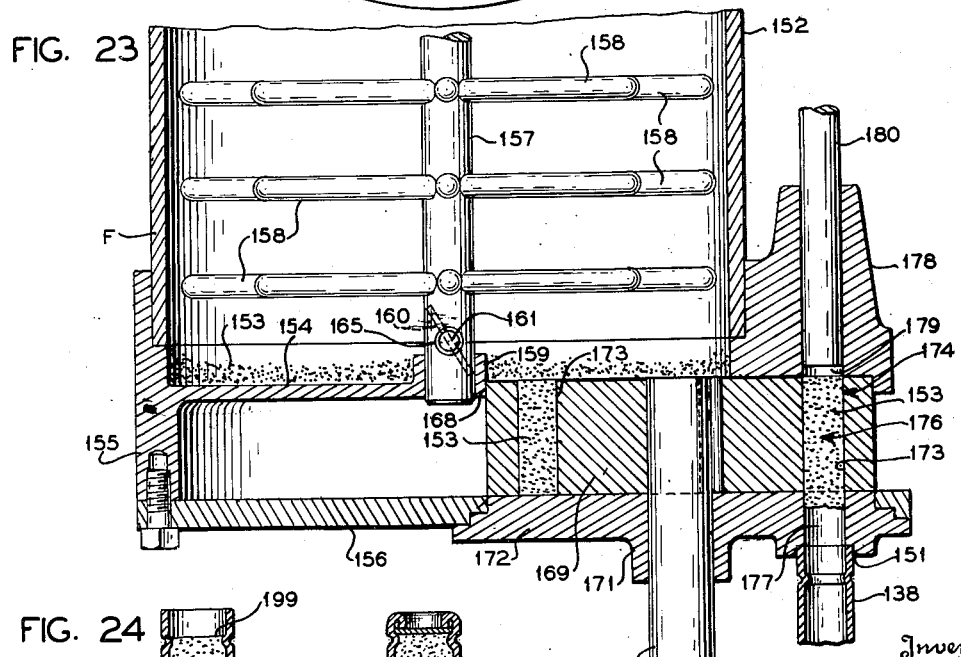
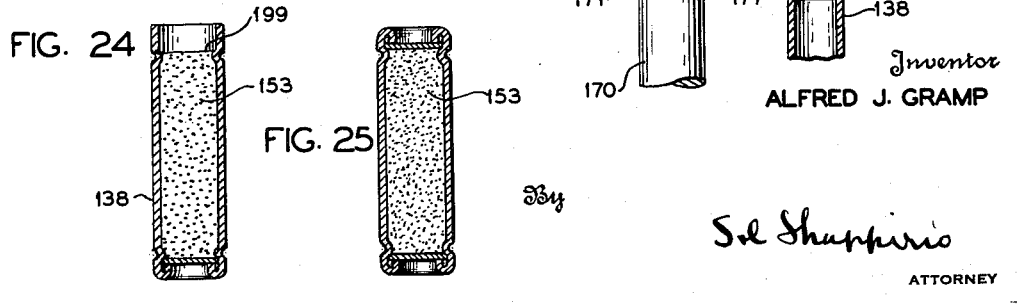
Inventor
ALFRED J. GRAMP
By
S. L. Shapiro
ATTORNEY July 25, 1961 A. J. GRAMP 2,993,317
MACHINE FOR PRODUCING AND FILLING TUBULAR CONTAINERS
Filed July 30, 1951 12 Sheets-Sheet 10

INVENTOR.
ALFRED J. GRAMP
BY
Sol Shapiro
ATTORNEY

July 25, 1961 A. J. GRAMP 2,993,317
MACHINE FOR PRODUCING AND FILLING TUBULAR CONTAINERS
Filed July 30, 1951 12 Sheets-Sheet 11

INVENTOR.
ALFRED J. GRAMP
BY
Sol Shapiro
ATTORNEY

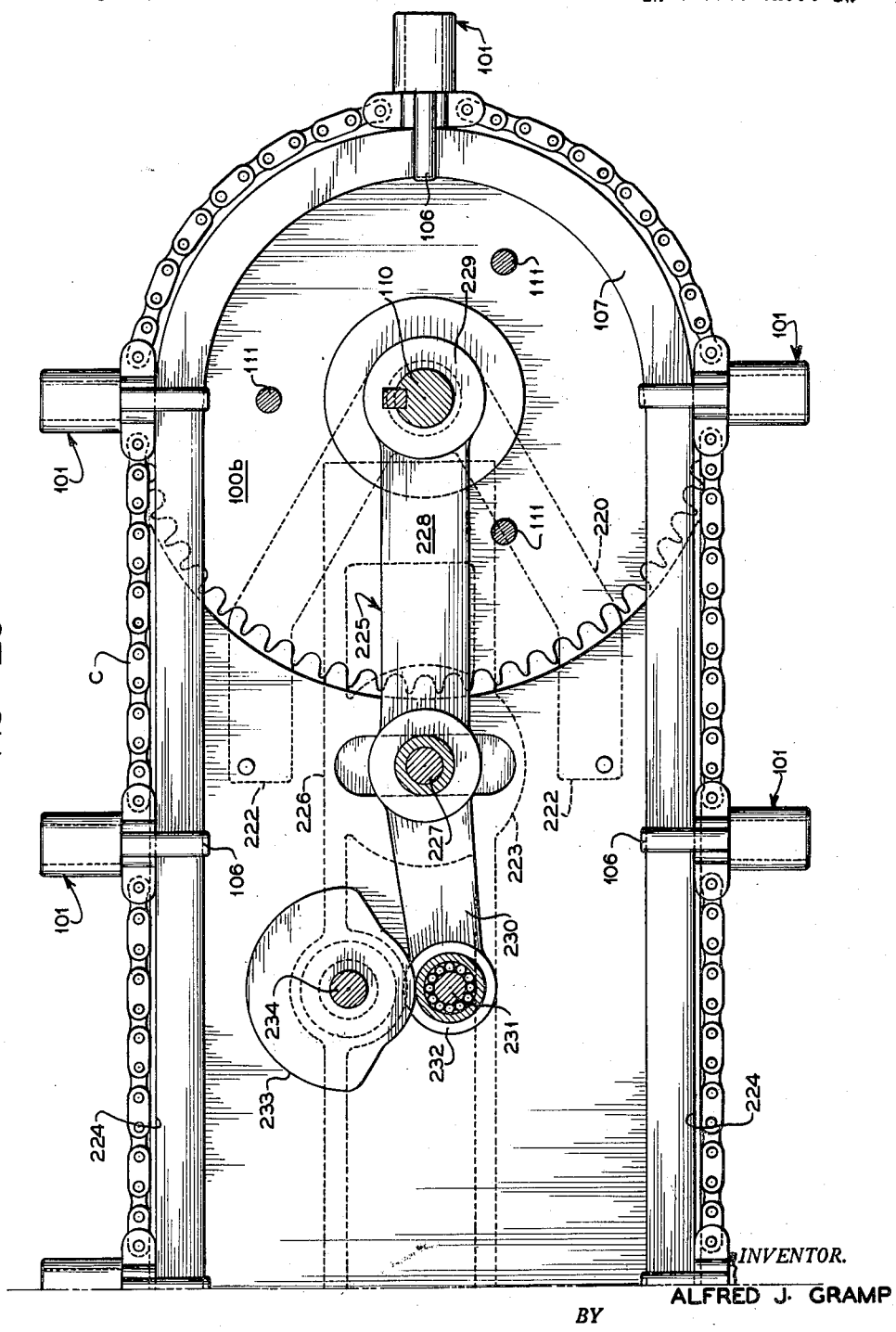

United States Patent Office 2,993,317
Patented July 25, 1961

2,993,317
MACHINE FOR PRODUCING AND FILLING TUBULAR CONTAINERS
Alfred J. Gramp, 231 W. Wyoming Ave., Philadelphia, Pa.
Filed July 30, 1951, Ser. No. 239,221
3 Claims. (Cl. 53—191)

This invention relates to methods and apparatus for automatically producing and filling containers, particularly of the tubular capsule type and to the containers themselves. Specifically the invention includes conversion of a discrete length of tubing into a container, filling the container with a predetermined quantity of material, and closure sealing the filled container.

A variety of methods and machines have heretofore been proposed for producing and filling containers. For the most part, while satisfactory for some purposes, they were unsuited to handling certain types of material particularly when the latter was hygroscopic. In addition, accurate measurement of filling material was not uniformly accomplished. In other cases the mechanism was too complex resulting in uneconomical manufacture that could not meet price competition. In still other uses the methods and machines were not flexible enough to enable ready adjustment to varying conditions. In some cases, filling of fluent solid material required vibratory effects to fill the containers. These and many other defects and disadvantages appeared in prior art practices, particularly where the package was small and the quantity of material packaged was correspondingly small in volume.

Among the objects of the present invention there is included methods and apparatus for automatically and economically producing tubular type containers and filling and sealing the same.

Other objects include flexibility enabling the methods and machines to be adapted readily to varying materials and conditions.

Further objects include accurate measurement of the quantity of material dispensed to the container, regardless of the characteristics such as hygroscopicity, particle size, etc., of the material.

Still further objects include the production of hermetically sealed packaged material by automatic operation.

Still further objects and advantages of the present invention will appear from the more detailed description set forth below it being understood that such detailed description is given by way of illustration and explanation only and not by way of limitation, since various changes may be made by those skilled in the art without departing from the scope and spirit of the present invention.

Figure 5:
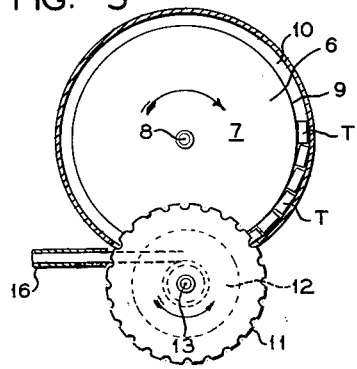
Figure 2:
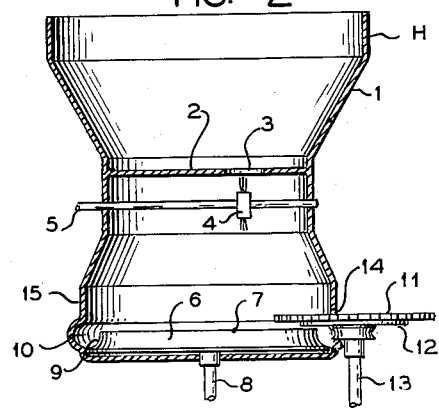
Figure 3:
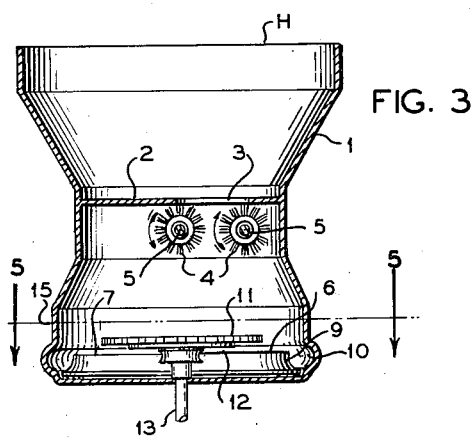
Figure 4:
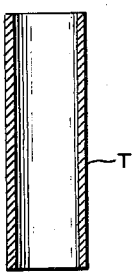
Figure 29:
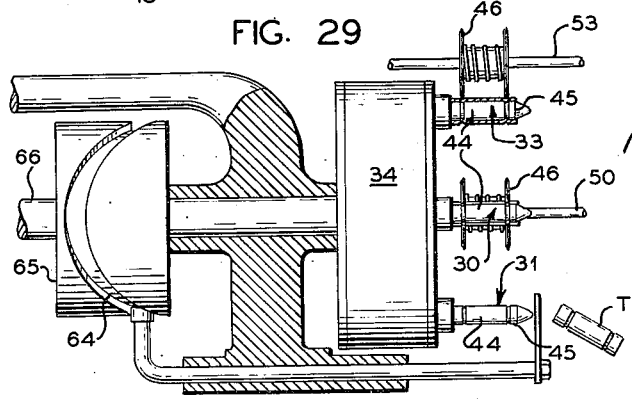
Figure 30:
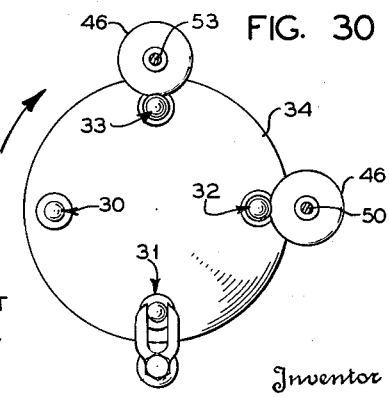
Figure 8:
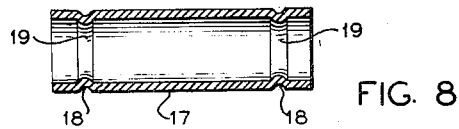
Figure 6:
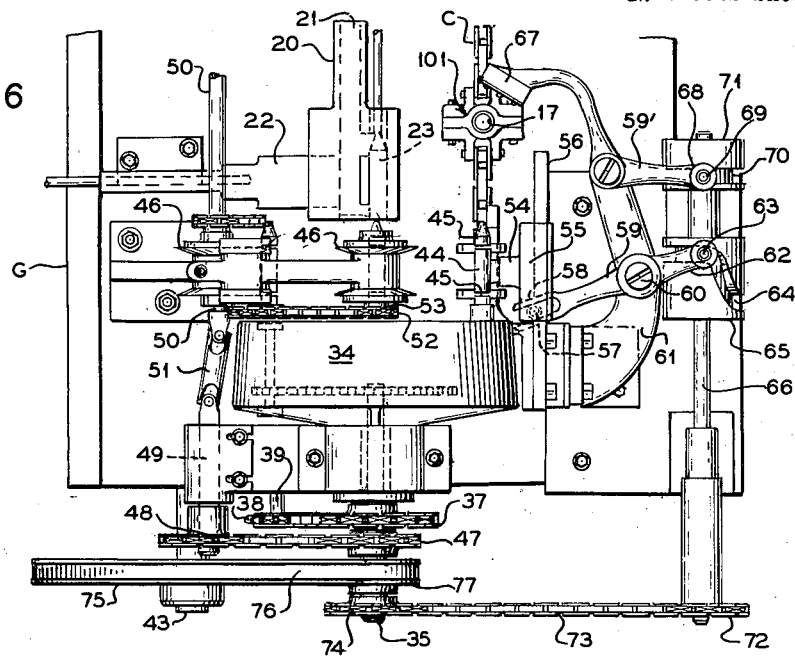
Figure 7:
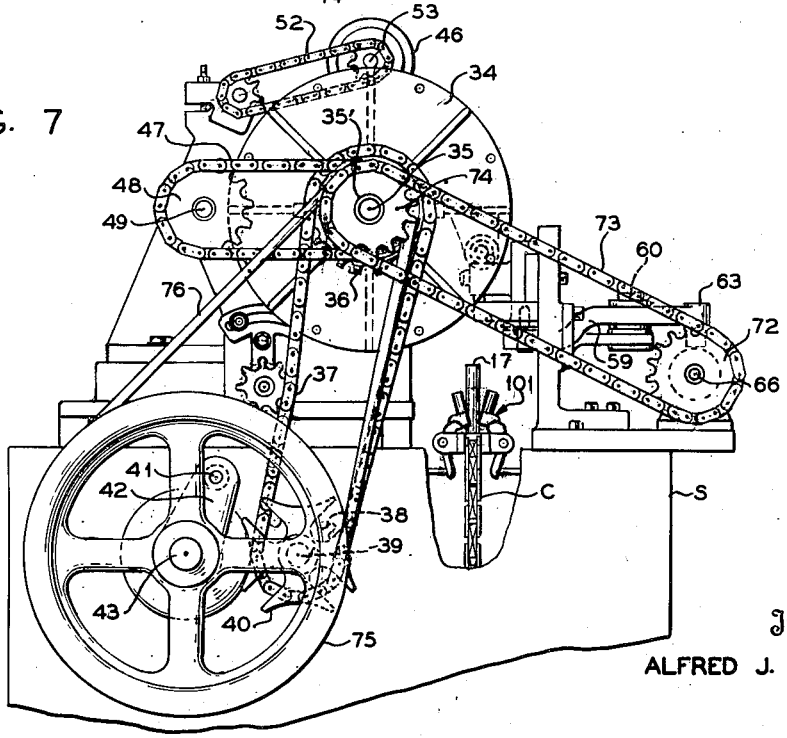
Figure 9:
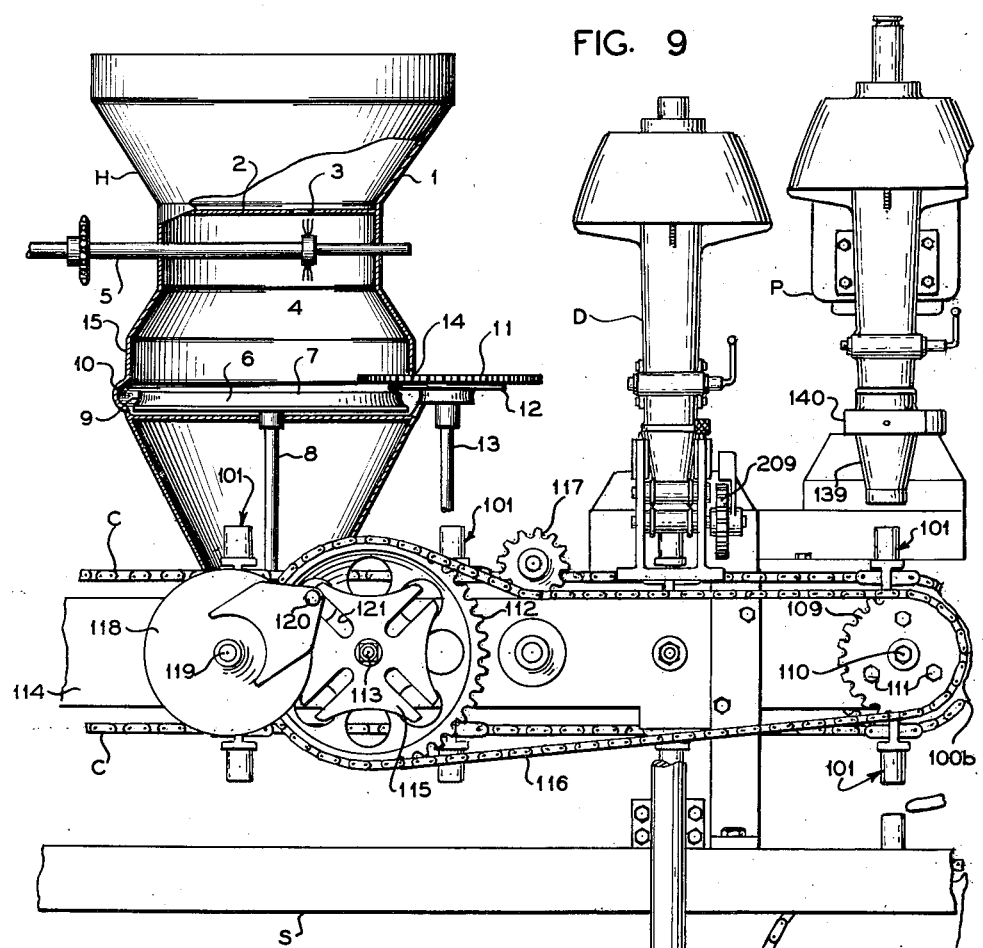
Figures 31, 32:
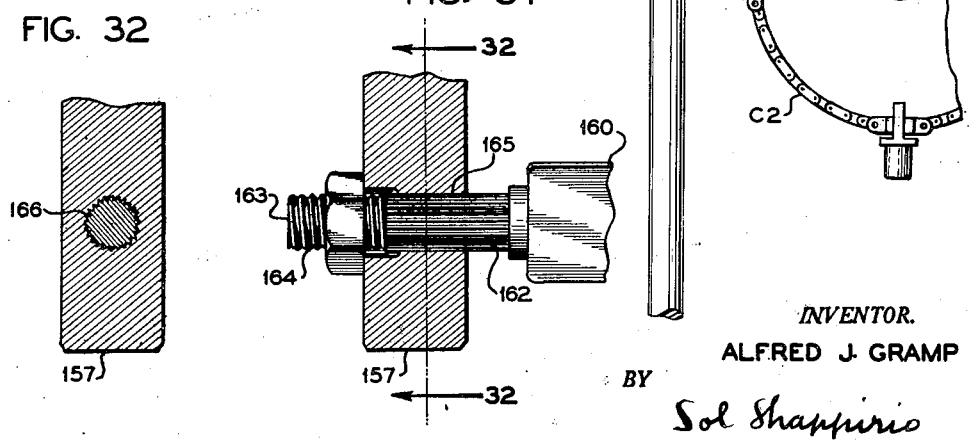
Figure 21:
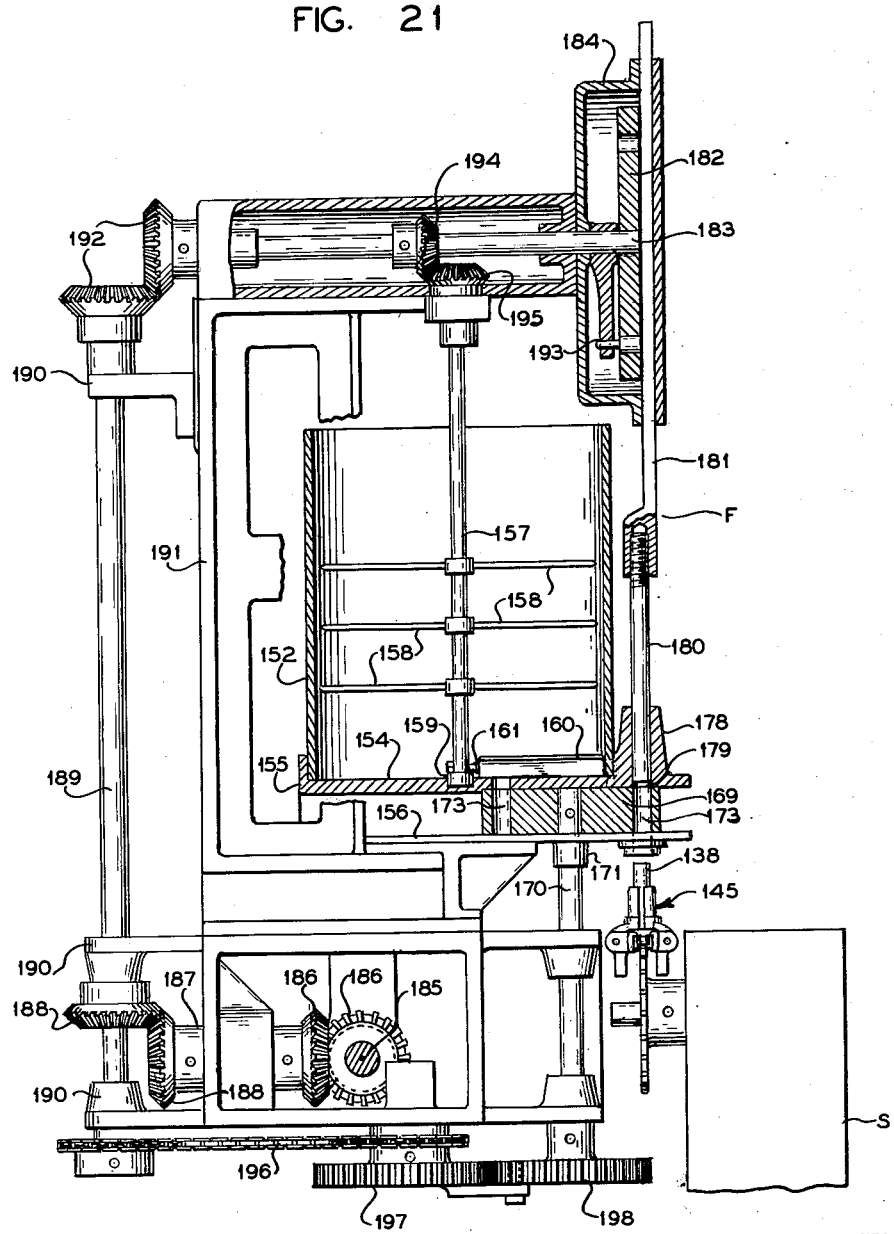
Figure 26:
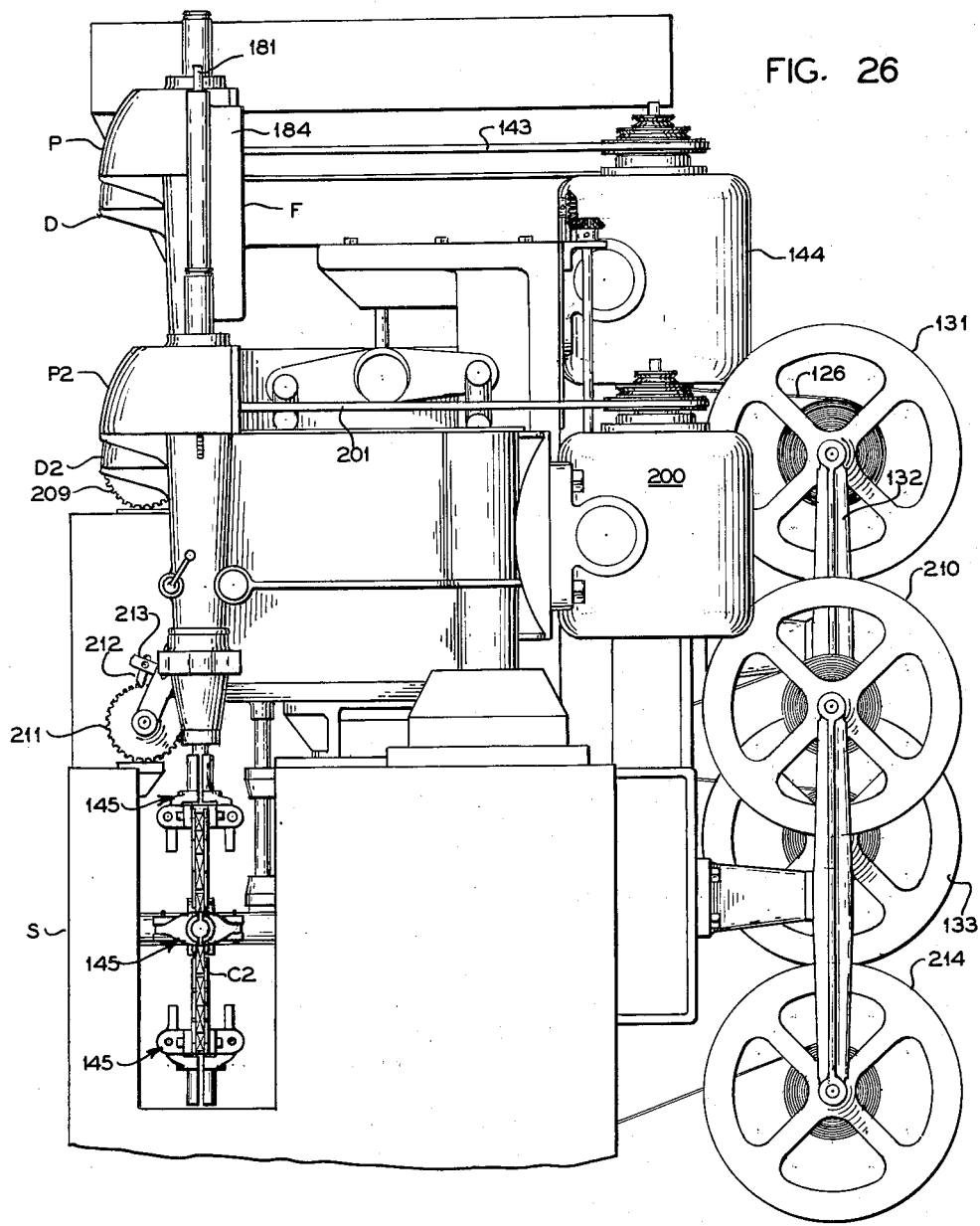
Figure 27:
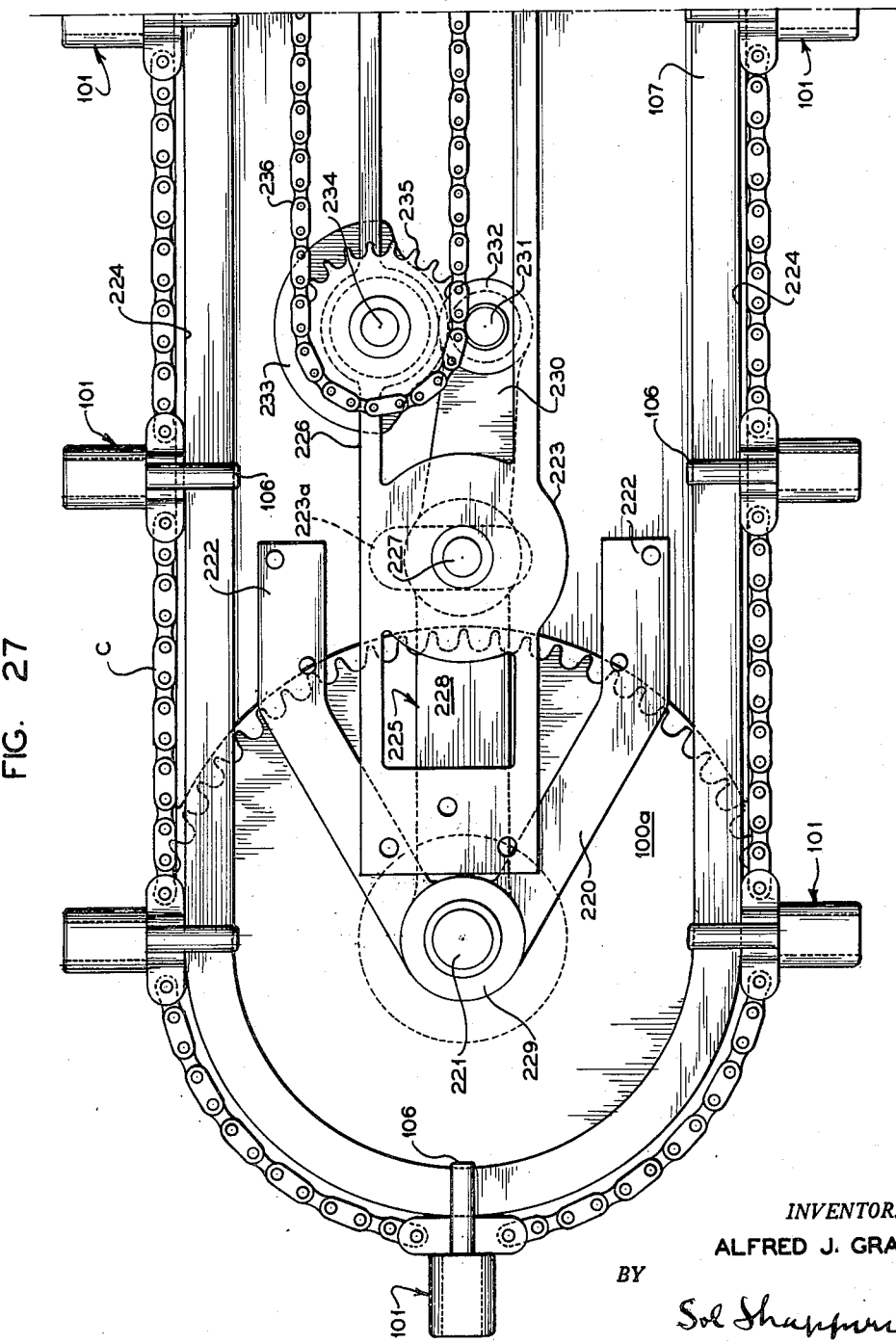

In connection with that more detailed description, there is shown in the accompanying drawings, in FIGURE 1, a front elevation of a machine for carrying out the present invention; in FIGURE 2, a vertical cross-section through a hopper and dispenser for the tubes to be acted on; in FIGURE 3, a vertical cross-section through the hopper and dispenser for the tubes at 90° to that of FIGURE 2; in FIGURE 4, a longitudinal cross-section through a tube used for making containers; in FIGURE 5, a transverse cross-section on line 5—5 of FIGURE 3; in FIGURE 6, a top plan view of the grooving station; in FIGURE 7, an end elevation of the station of FIGURE 6; in FIGURE 8, a cross section through the tube after grooving; in FIGURE 9, a front elevation of the machine at the first disc inserting and first peaning stations; in FIGURE 10, a top fragmentary view of a tube holder on the conveyor belt; in FIGURE 11, a side elevation of the holder of FIGURE 10; in FIGURE 12, a front elevation of the holder of FIGURE 10; in FIGURE 13, a front fragmentary elevation, partly in section, at the disc forming and inserting station; in FIGURE 14, a section through a tube after the disc inserting operation of FIGURE 13; in FIGURE 15, a front fragmentary elevation partly in section at the first peaning station; in FIGURE 16, a section through the container as formed at the first peaning operation; in FIGURE 17, a front fragmentary elevation at the inverting station; in FIGURE 18, a side elevation of the machine of FIGURE 17; in FIGURE 19, a section through the container formed at the first peaning operation, after inversion; in FIGURE 20, a front elevation of the machine at the filling station, the second disc inserting station and the second peaning station; in FIGURE 21, a side elevation partly in section at the filling station of FIGURE 20; in FIGURE 22, a transverse fragmentary enlarged section through the material hopper of FIGURE 20; in FIGURE 23, a fragmentary enlarged section through the hopper and delivery mechanism at the filling station; in FIGURE 24, a section through the filled container; in FIGURE 25, a section through the completed filled sealed container; in FIGURE 26, a rear elevation of the mechanism; in FIGURE 27, an elevation on an enlarged scale of the left hand portion of the elevating mechanism for the conveyors; in FIGURE 28, an elevation on an enlarged scale of the right hand side of said elevating mechanism with certain parts removed; in FIGURE 29, a detailed elevation partly in section, of one form of means for grooving tubes and removing grooved tubes; in FIGURE 30, an end view of FIGURE 29; in FIGURE 31, a detail in section of the scraper blade positioning mechanism; and in FIGURE 32, an end view of FIGURE 31.

In accordance with the present invention, sealed, filled containers are produced from open ended tubes or discrete lengths of tubing of the size and configuration desired, both as to cross section and length, by subjecting the tubes or lengths of tubing to a series of successive operations, all desirably carried out automatically. Generally a complete operation for converting the tubes or tubing initially employed, into the final sealed filled container will involve successive operations including first, transfer of discrete lengths of tubing from a source of supply such as a hopper, in proper alined sequence, to a grooving station; second, an operation on the discrete lengths of tubing to score the tubing length adjacent at least one end, but preferably both ends, to form a circumferential groove in the wall of the tube to provide a shoulder internally thereof adjacent an end of the tube; third, successive removal of scored tubes from the grooving station to conveying mechanism; and positioning of the scored tubes successively on said conveyor, in position, usually upright, for performing a forming operation on said scored tube; temporary locking of said tubes in such position on said conveyor; fourth, conveying said tubes in temporarily locked, preferably, upright position, to a closure forming station at which a closure disc is inserted in one end of the scored tube to form a closure therefor; fifth, conveying said closure carrying tube to a crimping or peaning station where the end of the tube adjacent the closure disc, to fix the disc rigidly in position and to form a container from the tube with a dust-free, sealed end; sixth, releasing the container thus produced from the temporary locking means, inverting it to material receiving position, placing it on a conveyor, and conveying the container to a filling station; seventh, filling the container with a predetermined volume of weight of the material to be packaged; eighth, conveying the filled container to a closure applying station where a closure disc is inserted into the filled container, the disc desirably being forced into position against an internal shoulder formed in the wall of the tube by the scoring operation; ninth, conveying the closed filled container to a crimping or peaning station where the end of tube adjacent said last mentioned closure disc is spun or curled inwardly adjacent said disc to fix the latter rigidly in position and to form a completely dust-free, hermetically sealed container; and tenth, delivery at a discharge station to a carton or other packaging receptacle for the finished product. Counting mechanism may be used at any desired stage or as a final distinct station as desired, and more fully explained below.

Desirably a complete operation will include all of the several operational steps referred to above, but where desired many of the individual operational steps may be used as separate entities, or various subcombinations of such individual operational steps may be employed depending on the particular type of package desired or the material being packaged, or both.

Before proceeding to a specific description of such operational details both as to method and apparatus, it may be pointed out that any kind of desirable stock may be used for the tubing from which the containers are to be made, as for example, cardboard, plastic, metal, or anything else that is sufficiently rigid or shape-retaining to be susceptible of handling in the manner set forth. The cardboard may be plain or coated or waterproofed as by wax, resin, plastic, etc. The wax includes both vegetable, animal and mineral waxes particularly paraffin waxes, etc. The resin may be any of the natural resins such as rosin, copal, etc., or synthetic resins such as phenolformaldehyde type resins, urea-formaldehyde type resins, alkyd resins, nylon type resins, melamine type resins, etc. The plastics include both thermoplastic and thermosetting materials including plasticized resins as set forth above, cellulose esters and ethers such as cellulose acetate, cellulose nitrate, cellulose acetate-butyrate, benzyl celluloses, ethyl celluloses and other cellulose ethers, and plasticized cellulose esters and ethers such as those set forth above. The metals include any spinnable metals or alloys including aluminum, aluminum alloys, magnesium alloys, etc., as well as coated metals as set forth.

The closure discs may be made from any desired stock including any of the materials set forth above for use for the tubing. Where the stock used for the discs is coated as by wax or heat sealing plastic, hermetically sealed containers or capsules are economically and readily produced. Such discs may be from stock coated on one or both sides, and the container stock may also be coated on one or both sides. If desired the discrete lengths of tubing or tubes or cylinders can be supplied with a lining such as a vegetable or greaseproof parchment lining or a waxed lining and coated strip stock with wax, etc., on both sides or heat sealing plastic on both sides which when heated will form a hermetic seal from one or both sides according to whether the strip stock is coated one or both sides. Heating sealing may be effected in such cases at the crimping or peaning station as by electrically heating this crimping tool to the proper degree of heat which, when it comes down into position for the crimping operation, will transmit the heat to the coated discs thereby affecting the heat seal as predetermined either top or bottom or both top and bottom. This or any other heat sealing operation may be used.

Or water repellency may be produced by treatment with alkyl or aryl silicon halides such as methyl silicon chlorides, phenyl silicon chlorides, mixtures of them, etc. Such treatment may be in vapor or liquid state of the reagent or the latter may be in solution in a solvent particularly an organic liquid. Exposure of the article to alkyl silicon halides for example need be for a short time only, as a matter of minutes is sufficient to produce substantial water repellency without any visual surface change in appearance. Any of the package or disc materials set forth may be treated in this way. And the treatment may be applied to the stock from which the tube or disc is made, to the fabricated tube or disc, to the container before filling, to the container after filled, or to the completed filled sealed container, or to the material to be packaged. Effective water repellency is readily obtained in this way.

The material to be packaged may be of any desired character including solids, viscous products and liquids. They may be hygroscopic or water resistant or non-absorbing. Preferably powdered or finely-divided solid materials are treated and even when hygroscopic and not very free flowing may be packaged as taught herein. Such materials may be readily packaged in such unit volume or weight as to make them a specific quantity for direct use by the consumer as by solution in a fixed volume or weight of water, without requiring troublesome weighing operations, or of course mixed materials may be packaged in this way either as compositions or as separately packaged units of materials to be used concurrently where association together in a single package is undesirable.

The type or style or size or configuration of the package may be varied within wide limits. It may be long or short, or of wide or narrow diameter. In cross section it may be of any desired shape such as round, oval, square, hexagonal, etc. The disc employed as closure will be of a contour to fit the cross-sectional configuration and give a tight closure. Because of its wide utility, the invention will be hereinafter exemplified by application to a relatively small capsule type container about one and one-half inches in length and possibly a half-inch in diameter, circular in corss-section without any implication of limitation thereto.

A general configuration of machine that may be used in carrying out the present invention and showing a preferred complete combination and interrelation of operations is illustrated in FIGURE 1 where a hopper H for the storage of the discrete lengths of tubing, or tubes, or cylinders from which the containers are to be made, delivers such discrete lengths of tubing to the grooving station generally indicated at G where the scoring takes place. From G the scored tubing lengths are delivered to the conveyor C and conveyed to the first disc-forming and inserting station D and then to the first peaning or crimping station P where the tubes ends are spun or curled to fix the first or initial closure in rigid position. As so produced the container is formed and is positioned on conveyor C bottom-up. At the end of conveyor C it is released thereon, turned through 180° and placed on the second conveyor $C_2$ where it is then delivered through the filling station F to the second disc forming and inserting station $D_2$, then to the second peaning or crimping station $P_2$ and finally to the delivery station E which ends the operations and delivers a finished, sealed, filled container. All such stations may be supported on any desired support or base S. A complete sequential operation may thus be carried out on the tubes to convert them into sealed, filled containers. The invention will be described in detail below and illustrated by successive operations on a series of discrete lengths of tubes, each tube being acted on in sequence at each of the stations. If desired a group of tubes may be treated at each station. Thus the conveyors instead of having a series of single tubes locked in position in sequence thereon, may have a pair or three etc., tubes alined at each locked position, two or three or more discs may be stamped out as necessary simultaneously at each disc forming and insertion station D, the two or three or more closure provided tubes delivered simultaneously to the peaning station P, two or three or more containers peaned simultaneosuly etc., throughout the sequence of operation. But illustration of treatment of single tubes successively will sufficiently explain the invention without implied limitation.

Tube delivery station

Referring now to FIGURES 2 to 5 of the drawing, the tube storage hopper and associated mechanism is illustrated. The hopper H has a sloping side wall 1 leading to floor 2 on which the discrete lengths of tubing or tubes or cylinders T are supported, the floor having an opening 3 through which the lengths of tubing are directed by sloping wall 1 between a pair of oppositely rotating brushes 4, 4 mounted on shafts 5, 5 driven in any desired way. The brushes serve several functions; for example they support the weight of the tubes or tubing lengths and prevent jamming on other delivery mechanism referred to below, they choose or select the tubes and sort them into a more uniform position, and as the tubes roll between the brushes they fall through the space between the brushes to a whirling disc 6 immediately below. The brushes may be mounted on shafts carried in movable bearing to adjust the space as desired between the brushes to control the feed of tubes therebetween.

The whirling disc 6 at the bottom of the hopper H, has a smooth upper surface 7, and is mounted for rotation on shaft 8, the outer edge 9 of disc 6 being arcuate to provide a raceway 10 of the proper size to accommodate the tubes or discrete lengths of tubing T (FIGURE 2). The centrifugal force set up by the disc 6 whirls the tubes towad the outer rim and against the walls where they drop down into the raceway 10, and at the same time, due to the direction of rotation (toward the dispensor outlet) the tubes are forced in that direction. A serrated disc 11 desirably of rubber has the traction rubber element 12 mounted thereon, all carried on shaft 13 for rotation intermittently. The disc 11 rotates through a slot 14 in the side wall 15, in the opposite direction of rotation of whirling disc 6 and functions to break up any log jam or tube misalinement which may occur, thereby providing a steady flow of tubes T in proper position. The tubes T contacting the traction rubber element 12 on the under side of serrated disc 11 are forced along to discharge outlet 16. From such discharge outlet 16 the tubes are delivered to the grooving station G.

Since most of the actions taking place in the tube dispenser are centrifugal in character, the use of a clutch is unnecessary. However, it is highly desirable to have as smooth a surface as possible on the parts of the whirling disc that contacts the tubes, so that the disc may readily bypass or slip on the tubes and avoid scuffing or other damage. This hopper and dispenser is highly successful and may be used for example at speeds up to 200 tube discharge per minute. If desired, however, the tubes may be manually delivered to the grooving station.

The grooving station

From the discharge outlet 16 of the dispenser (FIGURE 5) the discrete tubes are delivered at the grooving station G more particularly illustrated at FIGURES 6 and 7 where the tubes T are grooved or scored to form the article shown in FIGURE 8. Such article 17 as shown in FIGURE 8 is scored adjacent each end thereof to form a circumferential groove 18, 18 in the wall of the tube thereby to provide a shoulder 19, 19 internally of said tube adjacent the ends thereof. These shoulders form the seats against which impinge the closure discs later to be inserted as closures. The distance between the score lines is made to conform to the volume desired in the capsule for a given diameter of tube T and may be varied to vary the volume. While the grooves and corresponding shoulders could be produced one at a time, it is more feasible to produce both grooves simultaneously as follows.

In general the operation is desirably carried out as follows. A group of arbors or mandrels illustratively four in number, are individually revolved continuously within a gear housing, the four arbors for example being equidistant from one another i.e. 90° apart. While the arbors revolve continuously, the housing moves intermittently step-wise through 90° intervals or ¼ of a revolution so that each arbor is successively advanced through four positions. This allows four tubes to be worked each cycle. The arbor at the first position receives a tube either manually or from the discharge outlet 16 of the dispenser, the tube moving from outlet 16 into casing 20 having conduit 21. A slide 22 moves the tube into alinement with the arbor in the first position and slide 23 is then operated to move the tube over said arbor. Slides 22 and 23 may be cam-operated for intermittent action. The first arbor then advances through 90° to the second position where the initial scoring is carried out while the next arbor is brought to the first position to receive a tube. A further quarter turn carries the first tube to the third position where the scoring operation is completed while the second tube advances to position two for initial scoring, while a third arbor advances to position one for reception of an unscored tube. A further quarter turn brings the first tube to position four where it is removed from the arbor and placed on a conveyor for delivery to the closure inserting station D; the second tube advances to position three where the grooving is completed; the third tube advances to position two for initial grooving, and a fourth arbor moves into position one for reception of an unscored tube. Such intermittent quarter turn movement of the gear housing is continued, while each arbor spins continuously. Continuous revolution of the arbors on their own axis is desirable since grooving is acocmplished by revolving circular knives moving at the same speed as the arbors, the edges of the knives contacting the tubes to produce the impression or groove. Maintenance of such related speeds of arbors and knives is very desirable in order to obtain grooving or scoring while avoiding shearing.

In the device as shown in the drawing, the tubes delivered to the grooving station are placed on the arbors in succession as the latter travel through four positions. A tube is placed on arbor 30 in the first position. The arbor 30 carrying the tube is moved to the second position where it is given initial scoring while a second arbor 31 at the first position recieves a tube. The arbor 30 now moves to the third position to complete the scoring operation, arbor 31 moves to the second position for initially scoring, while arbor 32 moves to tube receiving first position. The fourth position completes the cycle, at which point the tube on arbor 30 is removed therefrom and transferred to conveyor C, the tube on arbor 31 is given final scoring, the tube on arbor 32 receives initial scoring, while a tube is placed on arbor 33 to begin the cycle. This step-by-step movement is transmitted to the arbors by rotation of gear housing 34 on shaft 35' on which sprocket 36 is mounted and operated by chain 37 on sprocket 38 carried by shaft 39, on which Geneva gear 40 is also keyed so that rotation of gear 40 gives step-by-step movement of gear housing 34 through 90° intervals. Gear 40 is actuated by pin 41 on arm 42 carried by shaft 43. Shaft 35' is concentric with shaft 35.

Each of the arbors 30, 31, 32, and 33 is rotated continuously through connected gears within gear housing 34. Thus a drive gear in the housing 34, mounted on shaft 35 rotates therewith causing rotation of each arbor by a gear on each arbor meshing with the drive gear. Each arbor is cylindrical as shown at 44 and provided with grooves 45, 45 into which the body of the tube is depressed by the rotary knives, the grooves being spaced apart a distance equal to the separation of the knives, and each arbor has a reduced end to facilitate placing the tube thereon. Two sets of rotary knives 46, 46 are used, one set at each of the second and third positions, the two knives in each set being spaced apart for the distance separating the scored grooves. These knives rotate with the same peripheral speed as the arbors to produce scoring and not cutting. Rotary motion is transmitted to the knives from shaft 35 by chain belt 47 carried on sprocket 48 mounted on shaft 49 operating shaft 50 on which two knives 46, 46 are mounted, through link 51. The knives rotate at the same speed through chain belt 52 operating the shaft 53 carrying the knives 46, 46 at the third position. As each tube arrives at the second and third positions, it contacts the knives and is scored.

At the fourth position, fingers 54 on block 55 are reciprocated by movement of block 55 on track 56 (see FIGURE 6). A pin 57 on block 55 is received within the recessed end 58 of crank 59, the latter being pivotally mounted at 60 on lever 61. The end 62 of crank 59 carries a pin 63 which rides in cam slot 64 in cam 65 on shaft 66, the configuration of camway 64 producing the necessary movement of crank 59 to move fingers 54 against the end of a tube on arbor 30 when at the fourth position to force the tube off of the arbor. A second crank 59' pivoted on lever 61 serves to position a guard 67 in the path of any tube removed from the arbor at the fourth position and to direct it downwardly into the holder 101 on conveyor C (FIGURE 6) in position to receive such ejected tube. The holder is open at the time of delivery of the grooved tube therein. For this purpose the holder may be operated in the manner set forth below for operation of these holders at some positions or stations as explained below in connection with FIGURES 10 to 12. As shown in FIGURES 6 and 7, the tube T has been received in the holder 101 and the latter is in the open position receiving the tube T therein. The end 68 of crank 59' has a pin 69 that rides in runway 70 in pulley 71 on shaft 66 to move the guard 67 into the necessary position at the properly timed intervals. Or any means may be used to place the ejected tube in the tube holder. Thus it may be manually moved from the arbor to the holder or a chute may be used. Rotation is given to shaft 66 through sprocket 72 by chain belt 73 operating over sprocket 74 on shaft 35.

Pulley 75 on shaft 43 drives belt 76 over a pulley 77 on shaft 35.

Conveyor operation

From the grooving station, as the grooved tubes of the character shown in FIGURE 8 are removed from the arbor at the fourth position at said station, the grooved tubes are successively fed to a conveyor C. See FIGURE 1 and FIGURES 8–12. The conveyor C mounted on sprockets 100a and 100b is of the chain type and carries a series of tube holders 101 arranged at regular intervals thereon. Each holder 101 consists of contact members 102, 102 each member 102 having an upper semi-cylindrical jaw portion 103 to accommodate the cross-sectional contour of the tube, and of a depth to hold the tube in position for successive working or filling operation. The jaw portions 103 are capable of limited arcuate movement to or from each other, by virtue of each member 102 being pivoted at 104 on cross-link 105 carried on conveyor C. Each member 102 has a depending relatively heavy leg portion 106 adapted to engage against a bar 107 on the support S and thereby swing into the heavy line position shown in FIGURE 12 in which position the jaw members 103 are maintained in closed position. Normally the jaws 103 are held in open position shown in dotted lines in FIGURE 12. Each member 102 has a depending leg portion 106 the position of which controls the jaw portions. At each station, a leaf spring 204 carried on the main frame or support 205 engages within a groove 206 in each leg portion 106 to force the depending legs outwardly and thus close the jaw members 103 to clamping or locking position. Opening of the jaw members 103 is accomplished when the holder leaves a particular station, by the action of a bar 107 having a cam-face 208 which engages against the outer face of the leg portion 106 forcing it inwardly thus moving jaws 103, 103 apart to open the holder. This operation of the jaws is carried out at each desired station. For example consider the grooving station 6. This open position is present while the particular holder 101 at the grooving station G is in position to receive the finished grooved tube T from the fourth position there, and is maintained for a sufficient time for the tube T to be positioned within the open jaws 103, 103 of the holder 101 as shown in dotted lines in FIGURE 12. After the tube T is positioned properly, step wise movement of conveyor C carries holder 101 carrying tube T forwardly toward the disc inserting station D.

Conveyor C is given step-wise movement by a Geneva movement (see FIGURE 9). Sprocket 109 is mounted on the same shaft 110 as sprocket 100b and bolted at 111 to sprocket 100b to turn therewith. Sprocket 112 is keyed on a shaft 113 carried by frame 114 and the Geneva gear 115 is also keyed on shaft 113 so that movement of gear 115 will move sprocket 112. A chain belt 116 is carried on sprockets 109 and 112, and the proper tension of the belt 116 provided by the take-up gear 117. Power is supplied through wheel 118 revolving on shaft 119, pin 120 on wheel 118 riding in slot 121 in Geneva gear 115. Revolution of wheel 118 by power supplied to shaft 119, will produce step-by-step movement of conveyor C to carry the grooved tubes 17 successively from the grooving station G to the disc inserting station D then to the peaning station P.

The disc inserting station

The fourth operation or station provides insertion of a disc within one end of the scored tube against the internal shoulder therein to form a closure for one end of the tube. While preformed discs can be used for this purpose, it is simpler to form each disc as required by a simple punch and die from strip stock, the male die serving first to punch out the disc and by continuing movement to insert the punched out disc into position within the grooved tube. Just prior to such punching operation, the holder 101 carrying tube T therein in locked position has arrived at the disc inserting station. FIGURES 1, 9 and 13 show the operations.

As holder 101 carrying the tube T moves into the inserting station D, the holder and tube is raised in a vertical direction so that the upper end of tube T is inserted into the lower end 123 of the lower (female) die 124 held in frame member 125 on support S. The manner of raising the holder is more particularly set forth below in connection with FIGURE 27. The strip stock 126 from which the disc is to be punched is drawn across and over the die 124 in the path of the upper (male) die 127. The latter has a cutting edge 128 and is carried on member 129 to which power is supplied in conventional manner to cause intermittent downward movement of die member 127 to punch out a disc 130 from stock 126 which disc 130 is inserted into tube T against the internal shoulder therein by continued downward movement of die 127 to form a closure therefore which is positioned in place as shown in FIGURE 14. The holder 101 and tube T are then removed from the lower end 123 of lower die 124, by lowering of the holder and tube as described below.

The strip stock 126 which is used for the closure is advanced automatically. The reel 131 (FIGURE 26)

carrying the strip stock 126 (FIGURE 13) is attached as shown at 132 to the rear of the machine; the stock is advanced between the upper die 127 and the lower die 124 (FIGURE 13) by ratchet 209 actuated by a pawl, etc., as more specifically described below for the second disc inserting station and collected on a wind-up reel 133.

The peaning station

From the Disc Inserting Station, the tube carrying disc 130 positioned therein is then carried forward by movement of conveyor C to the first peaning or crimping station P. In general it may be stated that at this station, the end of the tube 17 adjacent disc 130 is spun or crimped or curled inwardly adjacent said disc to fix the closure in position while the tube is locked in the holder. This station and operation are shown in FIGURES 1, 9 and 15. The holder 101 carrying tube 17 is moved to station P. The upper end 134 of tube 17 is contacted with rotatable tool 135 having recess 136 in its lower end against which end 134 engages. Rotation of tool 135 spins the end 134 inwardly as shown at 137 to form a lip against disc 130 to fix the latter rigidly in position in the end of tube 17, and thus form a container 138 from the tube 17 as shown in FIGURE 15. The tool 135 is rotated within a bearing 139 mounted on support 140, power being supplied through pulley 141 mounted on the upper end 142 of tool 135. Pulley 141 is rotated by belt 143 from motor 144 (FIGURE 26). The lip 137 engaging against disc 130 creates a dust free seal. The container 138 thus formed is in upside-down position insofar as filling is concerned and must be inverted. This is accomplished as follows.

Inverting station

As shown in FIGURES 1, 17 and 18, the conveyor C reaches the end of its forward travel at peaning station P, and is carried around sprocket 100b at this point. Holder 101 carrying container 138 therein is thus moved through 180° or ½ revolution to a position immediately above and alined with a holder 145 on a conveyor $C_2$. A series of such holders 145 are positioned at intervals on conveyor $C_2$ as described above for holders 101 on conveyor C, and each holder 145 is exactly like holder 101 as described above. A guard 146 is placed adjacent the end of conveyor C. When holder 101 has moved downwardly to its inverted position shown in FIGURE 17, the cam bar 107 release leg portions 106, 106 to unlock container 138; so that the latter is moved into holder 145. At this time the contact members 147, 147 of holder 145, exactly like contact members 102, 102 on holder 101; are in open position for receiving the container 138, by virtue of cam bars 107 engaging against depending legs 148, 148 to open the contact members 147, 147. Conveyor $C_2$ operates over sprockets 150 and 151. The inverted container is shown in FIGURE 18 in upright position as it now stands in holder 145 on conveyor $C_2$ and is moved to the filling station.

The filling station

The filling operation is carried out at the seventh station designated at F in FIGURE 1. As shown in more detail in FIGURES 20 to 22 the conveyor $C_2$ brings holder 145 into receiving position as shown in FIGURE 20, where the holder 145 is raised (as described below) to move the upper end of container 138 (FIGURE 23) into contact 151 with the lower end of the material discharge passage described below.

The hopper 152 is provided to contain the material 153 to be dispensed and filled into the containers, said hopper being shown as a cylindrical container, open at the top, and having a floor 154 provided with a peripheral flange 155 supporting the hopper 152 above the bottom 156. A shaft 157 carrying stirring arms 158 is mounted at its lower end in boss 159 carried on floor 155, for rotation within hopper 152. One or more scraper blades 160 are desirably mounted at the lower end of shaft 157, engaging against floor 154, to move material on the floor and into the measuring and delivery device described below. The scraper blades 160 are angularly adjustable to permit variation in the angle of contact with material on the floor to vary the action. As the angle of the scraper blade 160 is increased, the material is packed more tightly into the loader described below to increase the weight of material supplied for delivery. The adjustment of the blade 160 may be carried out by providing a shaft 161 on the end of blade 160, which shaft is serrated as shown at 162, the outer end 163 of the shaft 161 being threaded at 164. The lower end of the stirrer shaft 157 is provided with an opening 165 having serrated walls to receive the shaft 161 having serrations 162, a nut on threaded end 164 holding the parts assembled but permitting any desired positioning of the scrapper blade 160. Where more than one scraper blade is used, a similar mounting may be used by scattering the holes on the shafts for the blades.

Floor 154 is provided with an arcuate opening 168 within which a loader 169 moves. The loader 169 is a wheel mounted on shaft 170 to which power is supplied as explained below. Shaft 170 passes through bearing 171 carried on plate 172 which with bottom 156 completes the bottom for the material dispenser. The loader 169 being mounted eccentrically with respect to material hopper 152, is provided with a series of openings 173, illustrated as four in number and arranged at 90° intervals in loader 169. As the latter rotates, the openings 173 are successively filled with filling material 153, thus accurately measuring the amount of filling material to be delivered, and the filled openings moved into delivering position at 174. Such movement brings the filled opening 176 into alinement with discharge opening 177 in the plate 172 into which discharge opening the end of container 138 has been previously inserted (FIGURE 22). While freely flowing fluent material may run out from opening 176 through discharge opening 177 into container 138, it is desirable particularly where hygroscopic or non-free flowing material is being packaged, to provide for positive ejection of the material 153 into the container 138. For this purpose a boss 178 carried on hopper 152 adjacent loader 169 covers the upper portion of the latter where filling opening 176 is in position for delivery. Boss 178 is provided with a passage 179 which is alined with filling opening 176 in delivery position. In passage 179 a plunger 180 reciprocates by cam action, the extent of movement of the plunger being sufficient to clear filled opening 176 (FIGURE 22). Plunger 180 is attached to rod 181 (FIGURE 21) the latter being operated by revolving cam 182 mounted on shaft 183 in housing 184.

The power at station F is supplied as follows. Rotating shaft 185 (FIGURE 21) to which power is supplied directly, transmits such movement through gears 186 to shaft 187 which in turn transmits the movement through gears 188 to shaft 189 carried in bearings 190 on frame 191. The upper end of shaft 189 is geared at 192 to shaft 183 which on rotation moves pin 193 that operates cam 182 and causes reciprocation of rod 181 and plunger 180. Shaft 183 carries a gear 194 intermediate its ends which meshes with gear 195 on stirrer shaft 157 to rotate the latter. Shaft 189 at its lower end drives chain belt 196 which rotates gear 197 meshing with gear 198 on shaft 170 to rotate loader 169. Intermittent movement of shaft 170 provides step wise movement of loader to delivery position. In this way the various operations at filling station F are coordinated.

The material of which the loader 169 is made should be chosen with respect to the filling material being dispensed to avoid undue sticking or agglomeration. For example "synthane" (laminated Bakelite) is a commercially available product which may be desirably used with hygroscopic materials such as the tetra organo ammonium derivatives used for bactericides; while the latter tend to "pack," "synthane" gives sufficient freedom of movement. The plunger 180 and the plate 172 may also be made of "synthane" if desired; but any desired material may be used for any of the parts of the filling station.

The filled container resulting from the filling operation is shown in FIGURE 24 the container 138 carrying the predetermined volume of filling material 153 measured thereinto and extending up to the internal shoulder 199. This filled container is now ready for the final closure.

Second disc inserting station

As shown in FIGURE 20, the holder 145 is carried on conveyor $C_2$ from the filling station F to the second disc inserting station $D_2$ where the disc is formed and inserted into the filled container by operations exactly like those carried out at the first disc inserting station D to which reference is made. As illustrated in FIGURE 13, the disc is punched from the strip and inserted into the tube T. As shown in FIGURE 26, the strip stock for this second disc inserting station is obtained from reel 210 at the rear of the machine, a ratchet 211 operated by pawl 212 being actuated by arm 213 to draw the strip stock over the die as shown in FIGURE 13. Unused strip stock is rolled up on reel 214, which is rotated for this purpose.

Second peaning station

As shown in FIGURE 20, after the second closure disc has been inserted at station $D_2$, the conveyor $C_2$ carries the container to the second peaning station $P_2$ where the operations carried out are exactly like those at station P and need not be further described. The power for operation of the second peaning station is supplied from motor 200 via belt 201 to a pulley at the second peaning station exactly like pulley 141 at the first peaning station. When the second peaning operation has been completed at station $P_2$ (FIGURE 20), the conveyor $C_2$ reaches the end of the travel and returns over sprocket 151, inverting holder 145. At that time the jaws 147 are unlocked and the completed filled sealed container released to fall at delivery station E (FIGURE 1) into hopper 202 through chute 203 for delivery to a receiving station.

The elevating mechanism

It has been pointed out above, that the operations at both disc inserting and both peaning stations as well as at the filling station involve raising the tube or container into contact with the operating mechanism at each such station. This is best carried out by mounting the conveyors carrying the tubes so that elevation of the conveyor takes place as a unit with corresponding simultaneous elevation at the several stations. Each conveyor C and $C_2$ is provided with mechanism to elevate it as a unit. Thus when conveyor C is elevated, the tubes are raised simultaneously at the first disc inserting station and the first peaning station. When conveyor $C_2$ is elevated, the tubes are raised simultaneously at the filling station, the second disc inserting station and the second peaning station. The elevating mechanism may be identical for both conveyors and is particularly illustrated below in FIGURES 27 and 28, and explanation for conveyor C will serve equally for both.

The conveyor C carrying holders 101, moves over sprockets 100a and 100b as explained above. A V-shaped bracket 220 carried on shaft 221 is attached at 222 to a support plate 223 the edges 224 of which lie adjacent the conveyor C. A rocker arm 225 is pivoted on supporting frame 226 at 227 for rocking movement. One end 228 of rocker arm 225 has bearing 229 for mounting it on shaft 221 which latter carries the sprocket 100a and bracket 220. The other end 230 of the rocker arm 225 has a cam follower bearing 231 on which a roller 232 is engaged by cam 233. The latter contacts against roller 232. Cam 233 mounted on shaft 234, is rotated by sprocket 235 on shaft 234, a chain 236 operating sprocket 235. Power is supplied to chain 236 for this purpose.

Each conveyor has four rocker arms 225, four brackets 220 and also other associated mechanism, one pair of rocker arms, one pair of brackets, and related parts being placed at each end of each conveyor. Thus operation of the chain 236 will rotate cam 233 causing elevation of each conveyor as a unit to move holders simultaneously in a vertical direction at each operating station. When rocker arms 225 are moved to elevate their outer ends 228, shaft 221 is moved upwardly carrying all of the mechanism. Thus V-brackets 220 also move upwardly carrying plate 224 vertically which plate 224 engages against conveyor C moving it with the holders. Relative movement between support plate 223 and shaft 227 is permitted by providing slot 223a in plate 223 through which shaft 227 passes. The holders carrying tubes are thus forced upwardly into contact with the mechanism at each operating station. When cam 233 moves to the retracting position, the parts move to their lower position, and the holders are released from contact with the operating mechanism at the stations. The supporting frame 226 carries all of the elevating mechanism, frame 226 being rigidly supported in position.

The cam operation and rocker arm movement is adjusted to provide elevation of the conveyor for a length of time sufficient for the station operations. As soon as the latter is completed, the conveyor unit is lowered, the conveyor is moved as described above to advance each holder one station. As soon as that advance has taken place, the elevating mechanism again operates, and so on, continuously.

The various operations throughout are of course coordinated to be carried out successively. The delivery of discrete lengths of tubes from hopper H to grooving station G supplies such tubes so that a step-by-step grooving operation as explained above is applied. The conveyors then advance the tubes step-by-step through the successive forming, filling, and sealing operations so that continuous operation is possible, a tube advancing successively in each step-by-step movement through first disc inserting station D, first peaning station P, filling station F, second disc inserting station $D_2$ and second peaning station $P_2$ to final delivery E.

The power for operating the various stations may be supplied in any desired way but it is a simple matter to utilize a single motor as a source of power which is then transmitted by appropriate gearing to each of the moving elements as desired.

Counting mechanism of any desired type may be used with the machines set forth above. For example, a long screw, much the same as a lathe screw, may be geared to any proper shaft such as the main shaft. A hand lever may be used to raise or lower a half nut of the same pitch thread as the screw, which nut slides along a bar parallel to the screw. Positions representing 100, 250, 500, and 1000 may be accurately marked on the bar. The hand lever is moved along to the desired mark or position and the half nut engaged in the proper thread. The screw advances the carriage until a set micro switch turns off current and sets brakes. Another notch may be used to provide continued operation without cessation. Such counting device is accurate but since it counts machine revolutions only—due to its gearing to the main shaft, it does not actually count the completed tubes.

In order to overcome this deficiency there been devised a safety device attached under the filling station mouth, and in the path of tubes going by on conveyor. This is a device, funnel-like in construction and swinging in nature. It mechanically swings out only when a tube coming by pushes it away. A lever attaching the device to a visual counter which is registered every time the device is swung aside by a capsule. If a tube fails to come through, the device stays in position and does not register on counter. At the same time, if tube fails to come through, the device catches the powder which would have normally gone into the tube and directs same to salvage container, thereby eliminating powder being thrown all over the mechanism and interfering with operation of moving parts. At the end of the run, the operator compares the number of registered pieces on the visual counter which is accurate. If any discrepancy occurs, operator makes up the difference between the number predetermined by set mechanism and the visual counter.

Having thus set forth my invention, I claim:

1. In a machine for automatically producing and filling tubular capsules, in combination, means a continuous conveyor for supporting discrete lengths of tubing of spinnable stock, means for intermittently moving said conveyor to carry the tubing through a series of operating stations in each of which at least one step in forming and filling containers is carried out, means for locking each length of tubing in fixed position on said belt at each operating station, means for simultaneously elevating the conveyor at all of the stations to bring at least one tubing simultaneously into position for the operation at each of the stations, means for performing the operations on the tubing while in elevated position, means for simultaneously lowering the conveyor at all of the stations after the station operations, means for releasing the locking means, means for advancing the conveyor one station for repeating the operations whereby tubings successively advance through each station.

2. In a machine for automatically producing and filling tubular capsules, conveyor means, means for successively delivering tubular capsules of spinnable stock in spaced relation to said conveyor means, means for successively moving said conveyor means carrying said capsules through a series of operating stations in each of which at least one operation in forming and filling containers is to be carried out, means for simultaneously elevating the conveyor at all of said stations to bring capsule into position for the operation at each of said stations, and means for performing each operation on the capsule while in elevated position.

3. A machine as in claim 2 in which the operating means includes mechanism for inserting a disc into the capsule to form a closure therefor, means for spinning the end of the tubing inwardly adjacent said disc to fix the closure in position to form a container, means for forcibly injecting filling material into said container, means for inserting a disc into the open end of the filled container to form a closure therefor, and means for spinning the open end of the container inwardly adjacent the disc therein to fix the closure in position.

References Cited in the file of this patent

UNITED STATES PATENTS

| Number | Name | Date |
|---|---|---|
| 174,821 | Johnson | Mar. 14, 1876 |
| 494,688 | Olmstead | Apr. 4, 1893 |
| 646,355 | Butler | Mar. 27, 1900 |
| 713,491 | Quillfeldt | Nov. 11, 1902 |
| 802,653 | Moxham | Oct. 24, 1905 |
| 960,226 | Jenkins | May 31, 1910 |
| 1,104,658 | Goodfellow | July 21, 1914 |
| 1,133,426 | Beadle | Mar. 30, 1915 |
| 1,545,266 | Marsa | July 7, 1925 |
| 2,026,780 | Frostad | Jan. 7, 1926 |
| 2,081,042 | Krueger | May 18, 1937 |
| 2,089,273 | Lakso | Aug. 10, 1937 |
| 2,095,310 | Brandt | Oct. 12, 1937 |
| 2,100,480 | Hirshman | Nov. 30, 1937 |
| 2,106,739 | Harrison | Feb. 1, 1938 |
| 2,165,354 | Duane et al. | July 11, 1939 |
| 2,180,954 | Harrison | Nov. 21, 1939 |
| 2,426,714 | Sonnenberg | Sept. 2, 1947 |
| 2,449,478 | Herzog | Sept. 14, 1948 |
| 2,540,059 | Stirn | Jan. 30, 1951 |
| 2,550,903 | Berch | May 1, 1951 |